US011526562B2

(12) United States Patent
Shyamkumar et al.

(10) Patent No.: US 11,526,562 B2
(45) Date of Patent: Dec. 13, 2022

(54) DEVICE, SYSTEM AND METHOD FOR CONTROLLING DOCUMENT ACCESS USING HIERARCHICAL PATHS

(71) Applicant: MOTOROLA SOLUTIONS, INC., Chicago, IL (US)

(72) Inventors: Balaji Shyamkumar, Sammamish, WA (US); Curtis Porter, Stansbury Park, UT (US); Robert E. Bonham, Bountiful, UT (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 266 days.

(21) Appl. No.: 16/715,623

(22) Filed: Dec. 16, 2019

(65) Prior Publication Data
US 2021/0182344 A1    Jun. 17, 2021

(51) Int. Cl.
| | | |
|---|---|---|
| G06F 17/00 | (2019.01) | |
| G06F 7/00 | (2006.01) | |
| G06F 16/93 | (2019.01) | |
| G06F 16/185 | (2019.01) | |
| G06F 16/9032 | (2019.01) | |
| G06F 16/901 | (2019.01) | |
| G06F 21/62 | (2013.01) | |

(52) U.S. Cl.
CPC ........... *G06F 16/93* (2019.01); *G06F 16/185* (2019.01); *G06F 16/901* (2019.01); *G06F 16/9032* (2019.01); *G06F 21/6218* (2013.01)

(58) Field of Classification Search
CPC .... G06F 16/93; G06F 16/9032; G06F 16/901; G06F 16/185; G06F 21/6218

USPC ....................................................... 707/722
See application file for complete search history.

(56) References Cited

U.S. PATENT DOCUMENTS

| | | | | |
|---|---|---|---|---|
| 5,107,419 A | * | 4/1992 | MacPhail | ................ G06F 16/93 700/83 |
| 5,634,064 A | * | 5/1997 | Warnock | ................ G06F 16/93 715/788 |
| 8,332,430 B2 | | 12/2012 | Koide et al. | |

(Continued)

FOREIGN PATENT DOCUMENTS

EP    1907971 B1    4/2013

*Primary Examiner* — Pavan Mamillapalli
(74) *Attorney, Agent, or Firm* — Perry + Currier, Inc.

(57) ABSTRACT

A device, system and process for controlling document access using hierarchical paths is provided. A query, received from a requesting device, comprises: a search string for searching a document database; and an identifier associated with a user. A security permissions database is accessed using the identifier to receive permissible hierarchical document access paths indicating document access permissions associated with the identifier. A modified query includes the permissible hierarchical document access paths. The modified query used to access an index of the document database, the index comprising: a searchable content portion, and corresponding hierarchical document access paths, of a document. Document identifiers are received that identify only the documents having: respective searchable content portions that include the search string of the modified query; and at least one respective corresponding hierarchical document access path encompassed by the permissible hierarchical document access paths. The document identifiers are provided to the requesting device.

20 Claims, 6 Drawing Sheets

(56) References Cited

U.S. PATENT DOCUMENTS

| | | | |
|---|---|---|---|
| 9,224,004 B2 | 12/2015 | O'Sullivan et al. | |
| 2001/0051921 A1* | 12/2001 | Garner, IV | G06Q 20/042 |
| | | | 705/42 |
| 2002/0002563 A1* | 1/2002 | Bendik | G06F 16/93 |
| | | | 715/255 |
| 2002/0083178 A1* | 6/2002 | Brothers | H04L 63/10 |
| | | | 709/218 |
| 2002/0133708 A1* | 9/2002 | Gudorf | H04L 63/10 |
| | | | 713/186 |
| 2002/0188847 A1* | 12/2002 | Valeria | G06F 21/6218 |
| | | | 713/184 |
| 2003/0028622 A1* | 2/2003 | Inoue | G06F 21/6218 |
| | | | 709/219 |
| 2003/0160095 A1* | 8/2003 | Segal | G16H 10/60 |
| | | | 235/375 |
| 2005/0034054 A1* | 2/2005 | Tsuyama | H04N 21/258 |
| | | | 715/255 |
| 2006/0010097 A1* | 1/2006 | Hashimoto | G06F 16/93 |
| 2006/0047731 A1* | 3/2006 | Matsui | G06F 16/93 |
| 2006/0075327 A1* | 4/2006 | Sriver | G06F 16/93 |
| | | | 715/251 |
| 2006/0242064 A1* | 10/2006 | Jogand-Coulomb | G06F 21/10 |
| | | | 705/50 |
| 2007/0288714 A1* | 12/2007 | Nakamura | G06F 21/6218 |
| | | | 711/163 |
| 2009/0144250 A1 | 6/2009 | Kapadia et al. | |
| 2014/0344308 A1* | 11/2014 | O'Sullivan | G06F 21/6218 |
| | | | 707/769 |
| 2016/0366299 A1* | 12/2016 | Sato | H04N 1/32427 |

\* cited by examiner

DEVICE, SYSTEM AND METHOD FOR
CONTROLLING DOCUMENT ACCESS
USING HIERARCHICAL PATHS

BACKGROUND OF THE INVENTION

Security of documents in public safety environments is generally carefully managed to prevent unauthorized access to the documents. For example, each document may individually be assigned security permissions, and the like, which may not be considered when a user operating a requesting device searches for a document, which can lead to a waste of communications bandwidth, processing, and/or search resources.

BRIEF DESCRIPTION OF THE SEVERAL
VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
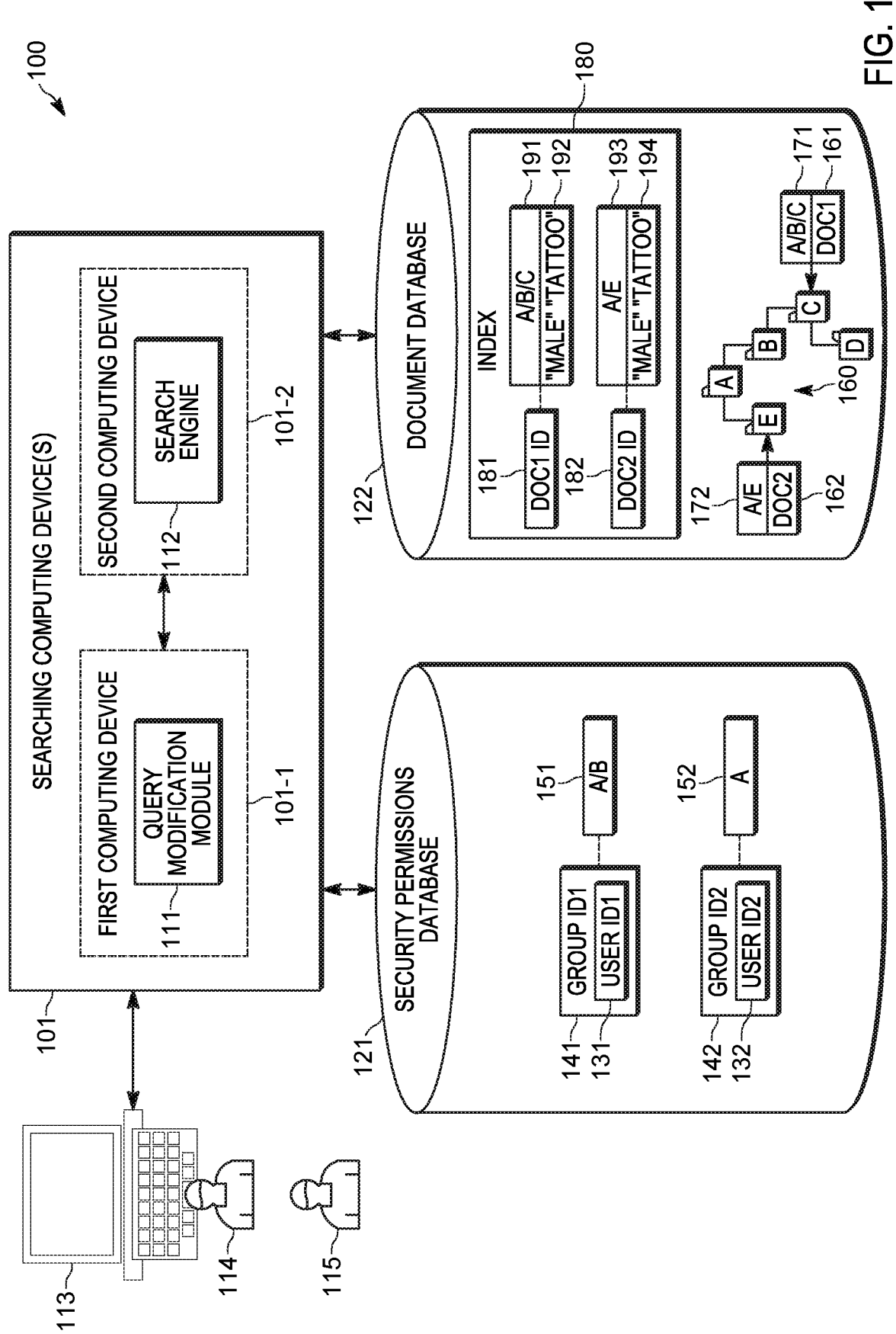
FIG. 1 is a system for controlling document access using hierarchical paths, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The device and process components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE
INVENTION

Security of documents in public safety environments is generally carefully managed to prevent unauthorized access to the documents. For example, each document may individually be assigned security permissions, and the like, which may not be considered when a user operating a requesting device searches for a document, which can lead to a waste of communications bandwidth, processing, and/or search resources. For example, a user, such as a police officer, may search a database for documents that include keywords; the search results generally include all documents that include the keywords, including documents that the user may not have access to due to document access permissions on individual documents. While the problem may be addressed by adding security attributes of individual documents to a documents index that enables pre-filtering and/or final filtering and/or verification of access after the documents are retrieved, this approach would require re-indexing of the documents whenever the security attributes of an individual document change.

Hence, according to the present specification, a security permissions database is provided that stores permissible hierarchical document access paths indicating document access permissions associated with identifiers of groups and/or users. In tandem, a document index of a document database is provided that comprises, for documents indexed by the document index: a searchable content portion of a document; and corresponding hierarchical document access paths of the document. When a user performs a search, an identifier of the user and/or group to whom the user belongs is provided along with a search string. Search results are returned identifying only the documents from the document database having: searchable content portions that include the search string; and at least one respective corresponding hierarchical document access path encompassed the one or more permissible hierarchical document access paths, as determined from the security permissions database. Put another way, security permissions are assigned to the user in the form of highest level permissible document access paths associated with the identifier of the user. Using document access permissions to users via document access paths may result providing search results that include only documents to which the user has access as only the permissible document access paths may be searched. Such an approach may also prevent re-indexing of documents when access permissions change for a user and/or a group.

An aspect of the specification provides a process comprising: receiving, at one or more computing devices, from a requesting device, a query comprising: a search string for searching a document database; and an identifier associated with a user; accessing, at the one or more computing devices, using the identifier, a security permissions database to receive one or more permissible hierarchical document access paths indicating document access permissions associated with the identifier; modifying, at the one or more computing devices, the query to include the one or more permissible hierarchical document access paths to generate a modified query; accessing, by the one or more computing devices, using the modified query, a document index of the document database, the document index comprising, for documents indexed by the document index: a searchable content portion of a document; and corresponding hierarchical document access paths of the document; receiving, by the one or more computing devices, search result document identifiers identifying only the documents from the document database having: respective searchable content portions that include the search string of the modified query; and at least one respective corresponding hierarchical document access path encompassed by the one or more permissible hierarchical document access paths; and providing, by the one or more computing devices, to the requesting device, the search result document identifiers.

Another aspect of the specification provides a computing device comprising: a communication unit; and a controller configured to: receive, via the communication unit, from a requesting device, a query comprising: a search string for searching a document database; and an identifier associated with a user; access, using the identifier, a security permissions database to receive one or more permissible hierarchical document access paths indicating document access permissions associated with the identifier; modify the query to include the one or more permissible hierarchical document access paths to generate a modified query; access, using the modified query, a document index of the document database, the document index comprising, for documents indexed by the document index: a searchable content portion of a document; and corresponding hierarchical document access paths of the document; receive, search result document identifiers identifying only the documents from the document database having: respective searchable content portions that include the search string of the modified query; and at least one respective corresponding hierarchical document access path encompassed by the one or more permissible hierarchical document access paths; and provide, via the communication unit, to the requesting device, the search result document identifiers.

Attention is directed to FIG. 1, that depicts an example system 100 for generating and rendering customized application data.

The system 100 comprises one or more searching computing devices 101, for example, as depicted a first computing device 101-1 and a second computing device 101-2 in communication with each other via any suitable communication links. Communication links between components of the system 100 are depicted in FIG. 1, and throughout the present specification, as double-ended arrows between respective components; the communication links may include any suitable combination of wireless and/or wired links and/or wireless and/or wired communication networks.

However, as depicted, functionality of the computing devices 101-1, 101-2 may be combined into the one or more searching computing devices 101 (e.g. as depicted, one or more searching computing devices). The one or more searching computing devices 101 will be interchangeably referred to hereafter as the computing devices 101 and/or the computing device 101.

As depicted, the first computing device 101-1 and/or the computing device 101 may operate a query modification module 111 that provides the one or more computing devices 101 with functionality for modifying queries, as described in more detail below. The second computing device 101-2 and/or the computing device 101 may operate a search engine 112 that provides the one or more computing devices 101 with functionality for accessing and/or searching a document database, as described in more detail below.

Hereafter, the functionality of the computing devices 101-1, 101-2 will be described with respect to the computing device 101; in other words, reference to the computing device 101 performing given functionality is understood to refer to one or more of the computing devices 101 performing the given functionality including, but not limited to, the functionality of the query modification module 111 and the search engine 112.

In the depicted example, the computing device 101 is in communication with a requesting device 113 operated, for example, by a user 114. As depicted, another user 115 may be waiting to operate the requesting device 113, and/or the user 115 may access the computing device 101 by operating another requesting device same or similar to the requesting device 113. As will be described below the different users 114, 115 may have different document access permissions and hence a search for same keywords performed by each of the users 114, 115 may lead to different search results.

The computing device 101 is further in communication with a security permissions database 121 and a document database 122. While particular database structures are depicted in FIG. 1, the components of the databases 121, 122 may be stored according to any suitable structure and/or in any suitable manner including, but not limited to, storing the information in one or more electronic, non-transitive databases and/or one or more electronic, non-transitive memories (e.g. that may or may not include databases and/or a database structure). Hence, for example, the databases 121, 122 are understood to be stored at one or more memories and/or the databases 121, 122 may be replaced by one or more memories.

The requesting device 113 may be operated by the user 114 and/or the user 115 to search the document database 122, as described in more detail below. The requesting device 113 may comprise a terminal, and/or personal computer and the like, however, the requesting device 113 may be any suitable device that may be used to search the document database 122 (e.g. via the computing device 101), including, but not limited to, one or more of a portable device, a laptop and the like.

Furthermore, the users 114, 115 may be public safety officers; in present examples the user 114 may be a police officer, and the user 115 may be a police detective with higher and/or more document access security permissions than the user 114. However, while present examples are described with respect to public-safety environments, the functionality of the system 100 may be for any environment where searching using access permissions occurs. Hence, the users 114, 115 may be any suitable user including a member of the general public, an employee of a business entity including private and/or enterprise security, and the like. Regardless, in present examples, the user 115 has higher and/or more document access security permissions than the user 114.

While the system 100 is depicted with only one requesting device 113 and two users 114, 115, the system 100 may comprise any suitable number of requesting devices 113 and/or users 114, 115.

The security permissions database 121 generally stores one or more of user identifiers of users with access permissions to search the document database 122, group identifiers of groups of users, and/or groups of user identifiers of users, with access permissions to search the document database 122. For example, as depicted, the security permissions database 121 stores a user identifier 131 of the user 114 and a user identifier 132 of the user 115.

As depicted, each of the identifiers 131, 132 are grouped with associated respective group identifiers 141, 142. For example, the user identifier 131 is grouped with the group identifier 141 indicating that the user 114 is a member of a group associated with the group identifier 141. Similarly, the user identifier 132 is grouped with the group identifier 142 indicating that the user 115 is a member of a group associated with the group identifier 142. For example, the user 114 may be member of a group of police officers identified by the group identifier 141, and the user 115 may be member of a group of detectives identified by the group identifier 142. As mentioned, it will be assumed that the user 115 and/or a group to which the user 115 belongs has been granted higher document permissions access to the document database 122 than the user 114 and/or a respective group to which the user 114 belongs.

While the security permissions database 121 is described with respect to two user identifiers 131, 132 and two group identifiers 141, 142, the security permissions database 121 may store any suitable number of user identifiers and/or group identifiers. Furthermore, user identifiers may be stored with or without being associated with a group. Similarly, while one permissible hierarchical document access path 151 is stored in association with the identifiers 131, 141, and one permissible hierarchical document access path 152 is stored in association with the identifiers 132, 142, the identifiers 131, 141, 132, 142 may be stored in association with any suitable number of hierarchical document access paths to which access has been granted for a respective user and/or a respective group. The user identifiers 131, 132 may be employee numbers, badge numbers and/or any other suitable identifier. The group identifier also may be any suitable identifier including, but not limited to, a textual name of a group (e.g. "Police Officer Group", "Detective Group") and the like.

In particular, the identifiers 131, 141 are associated with one or more permissible hierarchical document access paths 151 indicating document access permissions for documents stored at the document database 122. Similarly, the identifiers 132, 142 are associated with one or more permissible hierarchical document access paths 152 indicating document access permissions, for documents stored at the document database 122.

As depicted, the document database 122 stores documents in a file and/or folder structure 160. As depicted, the folder structure 160 comprises a root folder A, and/or a highest level folder A, storing a folder B that stores a folder C that stores a folder D. The folder A further stores a folder E. While the document database 122 is described with respect to folders and/or a folder structure 160, the document database 122 may store documents according to any suitable structure that includes document access paths.

As depicted the folder C stores a document 161 and the folder E stores a document 162. Each of the documents 161, 162 have been modified to include a respective header 171, 172 indicating a respective hierarchical access path of the documents 161, 162.

Document access permissions may be granted and/or managed by a security administrator of the system 100. For example, the documents stored in the document database 122 may be organized into folders that reflect the document access permissions represented by the permissible hierarchical document access paths 151, 152. Hence, for example, documents to which police officers (e.g. the user 114) have access are stored in folder B and/or folder C and/or folder D, while documents that police officers do not access to are stored in folder A and/or folder E. Documents that detectives (e.g. the user 115) are to have access to are stored in any of the folders A B, C, D, E, with documents that to which detectives are to have access, but not police officers, are stored in folder A and/or folder E.

For example, as depicted, the document 161 is stored in folder C, which is stored in folder B, which is stored in folder A; hence the hierarchical access path of the document 161 is "A/B/C", where the first position of the hierarchical access path indicates a root folder and/or a highest level folder "A" of the hierarchical access path, the second position of the hierarchical access path indicates a next folder "B" (e.g. stored in the root folder and/or the highest level folder "A" of the first position) and the third position of the hierarchical access path indicates yet a next folder "C" (e.g. stored in the folder of the second position). Similarly, as the document 162 is stored in folder E, which is stored in folder A, the hierarchical access path of the document 162 is "A/E".

Returning briefly to the security permissions database 121, the identifiers 131, 141 are stored in association with the permissible hierarchical document access paths 151 indicated as document access path "A/B". In particular, the document access path "A/B" indicates that the user 114 (e.g. associated with the identifiers 131, 141) has access to respective corresponding hierarchical document access paths encompassed by the path "A/B". For example, the user 114 has access to documents stored in the folder B, the folder C and the folder D. However the user 114 does not have access to documents stored in the folder A; nor does the user 114 have access to documents stored in the folder E. In other words, the user 114 has been granted access permissions only for documents encompassed by the path "A/B" that includes documents stored in any of the folders B, C, D. As such the user 114 has access to the document 161, but not the document 162.

In contrast, the identifiers 132, 142 are stored in association with the permissible hierarchical document access paths 151 as path "A", which indicates that the user 115, associated with the identifiers 132, 142, has access to respective corresponding hierarchical document access paths encompassed by the path "A". For example, the user 115 has access to documents stored in the folders A, B, C, D and E. As such, in contrast to the user 114, the user 115 has access to the document 161 and the document 162.

Put another way, a permissible hierarchical document access path, of the permissible hierarchical document access paths 151, 152, indicates a respective highest level hierarchical path to which a user associated with an identifier has been permitted access. For example, document access paths may be referred to as being "higher level" or "lower level" depending on whether a document access paths encompasses another document access path, or vice versa. In particular, when a first document access path encompasses a second document access path, the first document access path may be referred to as a higher level document access path as compared to the second document access path. Similarly, as the second document access path is encompassed by the first document access path, the second document access path may be referred to as a lower level document access path as compared to the first document access path.

In some examples, a first document access path may encompass a second document access path when the first document access path and the second document access path are a same level. For example the document access path "A/B" may encompass the folder "B". However, in other examples, a first document access path may not encompass a second document access path when the first document access path and the second document access path are a same level.

As will be described hereafter, in the system 100, document access permissions are managed via permissible hierarchical document access paths (e.g. permissible hierarchical document access paths 151, 152), such that a user may be granted permission to hierarchical document access paths of the document database 122 that are encompassed by respective permissible hierarchical document access paths.

As also depicted in FIG. 1, the document database 122 stores a document index 180 comprising respective identifiers 181, 182 of the documents 161, 162. For example, the identifiers 181, 182 respectively identify the documents 161, 162 and may comprise respective document names, and the like of the documents 161, 162.

The identifier 181 is stored in association with a hierarchical document access path 191 of the document 161. For example the hierarchical document access path 191 is depicted as "A/B/C", similar to the header 171. The identifier 181 is further stored in association with a searchable content portion 192 of the document 161 that may comprise keywords (including, but not limited to words, phrases and the like), and the like, of the document 161; while not depicted the searchable content portion 192 may comprise positions of the keywords, and the like, in the document 161 (e.g. a page number, a line number, and the like).

Similarly, the identifier 182 is stored in association with a hierarchical document access path 193 of the document 162. For example the hierarchical document access path 193 is depicted as "A/E" similar to the header 172. The identifier 182 is further stored in association with a searchable content portion 194 of the document 162, for example comprising keywords, and the like, of the document 162; while not depicted the searchable content portion 194 may comprise positions of the keywords, and the like, in the document 162 (e.g. a page number, a line number, and the like).

Furthermore, one or more of the documents 161, 162 may be stored in more than one location for example in the folder structure 160 and/or another document database. Alternatively, a link to one or more of the documents 161, 162 may be stored in another location in the folder structure 160 and/or another document database.

In these examples, one or more the headers 171, 172 may include a plurality of respective hierarchical document access paths and/or the document identifiers 181, 182 may be stored in association with a plurality respective hierarchical document access paths 191, 193. The hierarchical document access paths of the headers 171, 172 and/or the hierarchical document access paths 191, 193 may include paths to all the folders where a respective document 161, 162 is stored and/or where a link thereto is stored.

In examples where a document 161, 162 and/or a link to a document 161, 162 is stored in more than one location at the document database 122, a respective header 171, 172 may be updated, manually and/or automatically, to include hierarchical document access paths of the other locations. Such a situation may occur when a first user and/or administrator of the document database 122 wishes to share a document with a second user who may not have access to the document access path where the document is stored. As such, the first user may use any suitable interface to cause the document, and/or a link thereto, to be shared to a folder to which the second user has access, which may be at the document database 122 and/or another database. The sharing may cause the header of the document to be updated to include an access hierarchical document access path of the folder to which the document was shared and/or a link thereto. Such an update of a header of a document may cause a re-indexing of at least the document at the document index 180 to include the hierarchical document access path to the folder to which the document was shared and/or a link thereto. Hence, the document may be retrieved from any hierarchical document access path included in the document index 180.

In the example depicted in FIG. 1, the searchable content portions 192, 194 each comprise keywords "Male" and "Tattoo". Hence, a search of the document database 122 for documents that include the keywords "Male" and "Tattoo" may result in one or more of the documents 161, 162 being returned, depending on security access permissions of a user initiating the search, as described in more detail below.

The document index 180 may be populated when documents in the document database 122 are indexed, for example in an indexing process that may be implemented by the computing device 101 and/or an indexing computing device (not depicted). The indexing process may populate the document index 180 by analyzing documents in the document database 122 including, but not limited to, the documents 161, 162. For example, the indexing process may include analyzing the documents 161, 162 for keywords to populate the searchable content portions 192, 194. The indexing process may include analyzing the folder structure 160 and/or the headers 171, 172 to populate the hierarchical document access paths 191, 193.

Figure 2:
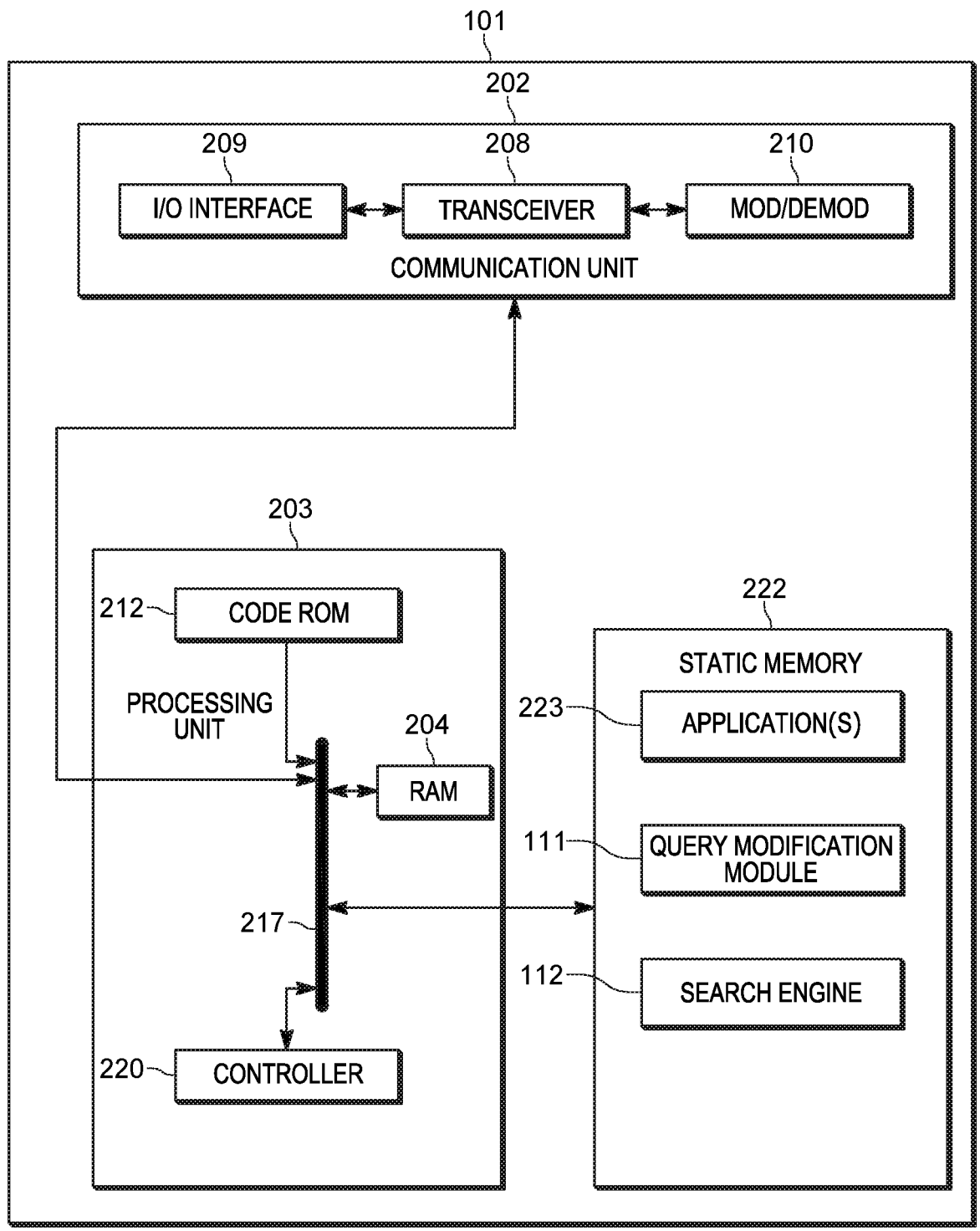
FIG. 2 is a diagram showing a structure of a computing device for controlling document access using hierarchical paths, in accordance with some examples.

Attention is next directed to FIG. 2 that depicts an example schematic block diagram of the computing device 101. In general, the computing device 101 may comprise one or more servers and/or one or more cloud computing devices, and the like, configured to communicate with the requesting device 113 and the databases 121, 122. However, the computing device 101 may comprise a computing device such as a personal computer and/or a laptop computer, an embedded computing device and the like. As described above, the computing device 101 may comprise the computing devices 101-1, 101-2.

As depicted, the computing device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223. As depicted the memory 222 further stores the query modification module 111 and the search engine 112; however the query modification module 111 and the search engine 112 may be stored as components of the application 223 and/or separately at the computing devices 101-1, 101-2, as described above.

In some examples, the memory 222 may store one or more of the databases 121, 122.

While not depicted, the computing device 101 may include one or more of an input device and a display screen, and the like, such that a user may interact with the computing device 101.

As shown in FIG. 2, the computing device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100. For example, the communication unit 202 may include one or more transceivers 208 and/or wireless transceivers for communicating with the requesting device 113 and/or the databases 121, 122. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a 5G network (e.g. a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components and/or peripheral devices.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for controlling document access using hierarchical paths. For example, in some examples, the computing device 101 and/or the controller 220 specifically comprises a computer executable engine configured to implement functionality for controlling document access using hierarchical paths.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the computing device 101 as described herein are maintained, persistently, at the memory 222 and used by the controller 220 that makes appropriate utilization of volatile storage during the execution of such programming instructions.

Figure 3:
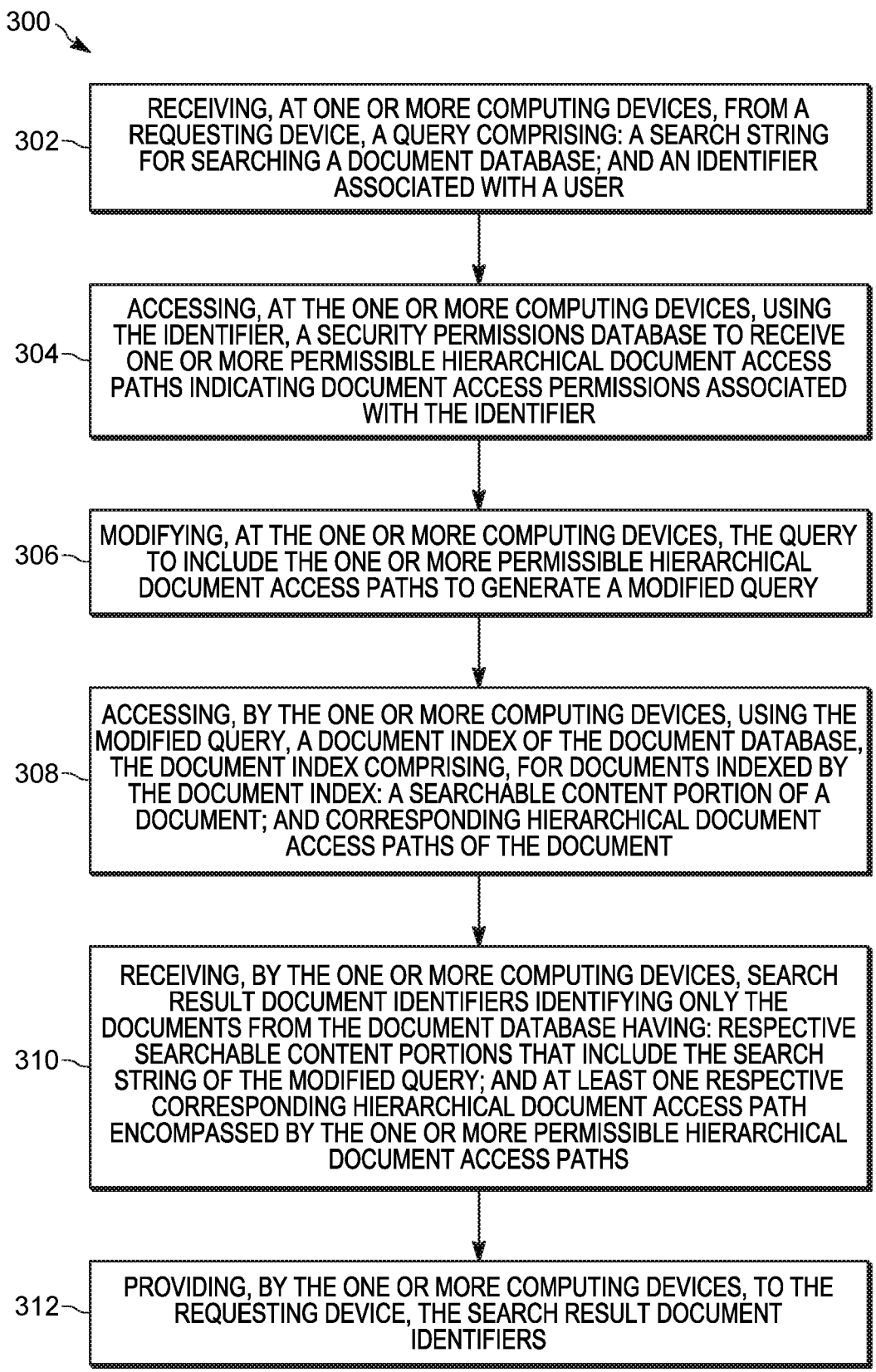
FIG. 3 is a flowchart of a process for controlling document access using hierarchical paths, in accordance with some examples.

In particular, the memory 222 stores instructions corresponding to the at least one application 223 that, when executed by the controller 220, enables the controller 220 to implement functionality for controlling document access using hierarchical paths including, but not limited to, the blocks of the process set forth in FIG. 3.

In illustrated examples, when the controller 220 executes the one or more applications 223, the controller 220 is enabled to: receive, via the communication unit 202, from a requesting device, a query comprising: a search string for searching a document database; and an identifier associated with a user; access, using the identifier, a security permissions database to receive one or more permissible hierarchical document access paths indicating document access permissions associated with the identifier; modify the query to include the one or more permissible hierarchical document access paths to generate a modified query; access, using the modified query, a document index of the document database, the document index comprising, for documents indexed by the document index: a searchable content portion of a document; and corresponding hierarchical document access paths of the document; receive, search result document identifiers identifying only the documents from the document database having: respective searchable content portions that include the search string of the modified query; and at least one respective corresponding hierarchical document access path encompassed by the one or more permissible hierarchical document access paths; and provide, via the communication unit 202, to the requesting device, the search result document identifiers.

While details of the computing devices 101-1, 101-2 are not depicted, when present, the computing devices 101-1, 101-2 may have a same or similar structure as that of the computing device 101 depicted in FIG. 2 adapted, however, for the functionality thereof. For examples, when the functionality of the computing device 101 is distributed between the computing devices 101-1, 101-2, each of the computing devices 101-1, 101-2 may comprise a respective application that performs a subset of the functionality of the application 223. For example, the computing device 101-1 may store the query modification module 111, and the computing device 101-2 may store the search engine 112.

Similarly, while details of the requesting device 113 are not depicted, the requesting device 113 may have a similar structure as that of the computing device 101, with components similar to the computing device 101 adapted, however, for the functionality of the requesting device 113. For example, the requesting device 113 may include respective a display screen, and one or more input devices (such as a keyboard), and the like and generally configured to interact with the computing device 101 to search the document database 122. In some examples, the functionality of the computing device 101 may be combined with the functionality of the requesting device 113.

Attention is now directed to FIG. 3 that depicts a flowchart representative of a method and/or process 300 for controlling document access using hierarchical paths. The operations of the process 300 of FIG. 3 correspond to machine readable instructions that are executed by the computing device 101, and specifically the controller 220 of the computing device 101. In the illustrated example, the instructions represented by the blocks of FIG. 3 are stored at the memory 222, for example, as the application 223 and/or the query modification module 111 and/or the search engine 112. The process 300 of FIG. 3 is one way in which the controller 220 and/or the computing device 101 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, the elements of process 300 are referred to herein as "blocks" rather than "steps." The process 300 of FIG. 3 may be implemented on variations of the system 100 of FIG. 1, as well.

It is further understood that the process 300 may be implemented by one or more of the computing devices 101, 101-1, 101-2, and hence the blocks of the process may hence be implemented by the controller 220 and/or the one or more computing devices 101.

Furthermore, the process 300 will be described using the example of the user 114 operating the requesting device 113 to search the document database 122.

At a block 302, the controller 220 and/or the one or more computing devices 101 receives, from the requesting device 113, a query comprising: a search string for searching the document database 122; and an identifier associated with a user 114. For example, the user 114 may enter, into a graphic user interface (GUI), and the like, at a display screen of the requesting device 113, a search string, such as ""Male" and "Tattoo"" and their user identifier 131 and/or the group identifier 141. Alternatively the user 114 may log into the requesting device 113 using their user identifier 131 and/or the group identifier 141 (e.g. and an associated password), and the requesting device 113 may automatically determine the user identifier 131 and/or the group identifier 141 from login credentials of the user 114.

Regardless, the requesting device 113 transmits a query, including a search string and an identifier (e.g. one or more of the identifiers 131, 141) associated with the user 114 and, at the block 302, the query is received at the controller 220 and/or the one or more computing devices 101.

At a block 304, the controller 220 and/or the one or more computing devices 101 accesses, using the identifier received at the block 302, the security permissions database 121 to receive one or more permissible hierarchical document access paths 151 indicating document access permissions associated with the identifier.

For example, as described above, the identifier received at the block 302 may comprise one or more of the user identifier 131 identifying the user 114; and the group identifier 141 identifying a group of which the user 114 is a member. As also described above document access permissions associated with the identifier 131 and/or the identifier 141, as indicated by the one or more permissible hierarchical document access paths 151 associated with the document access permissions, set forth the document access permissions of one or more of the user 114 and the group to which the user 114 belongs.

Hence, the controller 220 and/or the one or more computing devices 101 retrieves, from the security permissions database 121, the one or more permissible hierarchical document access paths 151.

At a block 306, the controller 220 and/or the one or more computing devices 101 modifies the query received at the block 302 to include the one or more permissible hierarchical document access paths 151 to generate a modified query. For example, the functionality of the block 304 and the block 306 may be performed by way of the controller 220 and/or the one or more computing devices 101 implementing the query modification module 111. Put another way, query modification module 111 may be configured to generate the modified query. The modified query generally comprises the search string received with the query of the block 302, and the one or more permissible hierarchical document access paths 151 retrieved from the security permissions database 121. The modified query may or may not include the identifier of the user 114.

At a block 308, the controller 220 and/or the one or more computing devices 101 accesses, using the modified query, the document index 180 of the document database 122. As described above, the document index 180 comprises, for documents 161, 162 indexed by the document index 180: a searchable content portion 192, 194 of a document 161, 162; and corresponding hierarchical document access paths 191, 193 of a document 161, 162.

Put another way, the controller 220 and/or the one or more computing devices 101 accesses the document index 180 to search for documents that include the search string received with the query of the block 302, and that are stored in hierarchical document access paths encompassed by one or more permissible hierarchical document access paths 151.

Hence, for example, the search string is compared to the searchable content portion 192, 194 to search for a match (and/or a partial match) therebetween; and the one or more permissible hierarchical document access paths 151 are compared to the corresponding hierarchical document access paths 191, 193 to search for a hierarchical document access paths 191, 193 encompassed by the one or more permissible hierarchical document access paths 151.

In other words, for a document identifier 181, to be returned by the document database 122, a searchable content portion 192, 194 may generally match (and/or a partially matches) the search string therebetween; and a corresponding hierarchical document access paths 191, 193 may be encompassed by the one or more permissible hierarchical document access paths 151.

At a block 310, the controller 220 and/or the one or more computing devices 101 receives search result document identifiers identifying only the documents from the document database having: respective searchable content portions that include (e.g. match and/or partially match) the search string of the modified query; and at least one respective corresponding hierarchical document access path encompassed by the one or more permissible hierarchical document access paths 151.

For example, the functionality of the block 308 and the block 310 may be performed by way of the controller 220 and/or the one or more computing devices 101 implementing the search engine 112. Hence, put another way, the search engine 112 may be configured to access the document index 180 using the modified query, and receive the search document identifiers.

As described above, both documents 161, 162 may include the search string (e.g. ""Male" and "Tattoo"") of the modified query. However the hierarchical document access path 191 of the document 161 (e.g. "A/B/C") is encompassed by the permissible hierarchical document access path 151 (e.g. "A/B"), while, the hierarchical document access path 193 of the document 162 (e.g. "A/E") is not encompassed by the permissible hierarchical document access path 151 (e.g. "A/B/C"). Hence, the controller 220 and/or the one or more computing devices 101 receives the document identifier 181 as a search result document identifier, but not the document identifier 182.

Put another way, the at least one respective corresponding hierarchical document access path 191 may be encompassed by the one or more permissible hierarchical document access paths 151, when the at least one respective corresponding hierarchical document access path 191 comprises a lower level hierarchical document access path of the one or more of the permissible hierarchical document access paths 151. However, in other examples, the at least one respective corresponding hierarchical document access path 191 may be encompassed by the one or more permissible hierarchical document access paths 151, when the at least one respective corresponding hierarchical document access path 191 comprises a same level hierarchical document access path of the one or more of the permissible hierarchical document access paths 151.

At a block 312, the controller 220 and/or the one or more computing devices 101 provides, to the requesting device 113, the search result document identifiers. For example, as the document identifier 181 was received at the block 310, at the block 312 the controller 220 and/or the one or more computing devices 101 provides and/or transmits the document identifier 181 to the requesting device 113. The requesting device 113 may then render the document identifier 181 at a GUI, and the like, at a display screen as search results received in response to the query transmitted at the block 302.

When the search results are provided at the requesting device 113, the user 114 may operate the requesting device 113 to select the document identifier 181 to retrieve the corresponding document 161, for example by transmitting, to the one or more computing devices 101, a request to retrieve a document 161 having the search result document identifier 181.

As such, the process 300 may further include, the controller 220 and/or the one or more computing devices 101: receiving a request to retrieve a particular document (e.g. the document 161) having a particular search result document identifier (e.g. the identifier 181) out of the search result document identifiers (e.g. one or more search result document identifiers) provided to the requesting device 113; and retrieving the particular document (e.g. the document 161) from the document database 122, the particular document comprising a header (e.g. the header 171) that includes one or more respective corresponding hierarchical document access paths (e.g. "A/B/C") where the particular document is accessible. As mentioned above, the header of the particular document may include one respective corresponding hierarchical document access paths and/or a plurality of respective corresponding hierarchical document access paths where the particular document is accessible.

While the present example is described with respect to one document, and hence one search result document identifier is found and provided to the requesting device 113, it is understood that the search of the block 308 and the block 310 may result in a plurality of documents, and hence a plurality of search result document identifiers being provided to the requesting device 113. In some of these examples, the controller 220 and/or the one or more computing devices 101 may rank the search results prior to providing and/or transmitting the search results to the requesting device 113 using any suitable ranking process, which may include, but is not limited to, ranking using machine learning algorithms trained to rank document searches; for example, the search result document identifiers may be provided in a list in an order of ranking, with document identifiers of higher ranked documents being higher in the list than document identifiers of lower ranked documents.

In some examples, the process 300 may further comprise the controller 220 and/or the one or more computing devices 101: subsequently changing, at the security permissions database 121, the document access permissions associated with the identifier to one or more of modify and remove at least one of the one or more permissible hierarchical document access paths, such that the identifier associated with the user no longer has permission to access respective documents accessible at the one or more permissible hierarchical document access paths that was one or more of modified and removed; and refraining from re-indexing the documents in the document database as a result of changing the document access permissions.

Again using the example of the user 114 performing a search using the requesting device 113, document access permissions for the user 114, and/or a group to which the user 114 belongs, may be changed by changing the hierarchical document access paths 151. In particular, hierarchical document access paths 151 may be edited and/or changed to remove a current hierarchical access path. For example, the hierarchical document access path 151 "A/B" may be removed and replaced with the hierarchical document access path "A/B/C/D" that removes access to the folder B and the folder C but maintains access to the folder D. Such a change in access permissions occurs without re-indexing the folder structure 160 and/or the documents 161, 162, for example as no change is made at the document database 122.

In some examples, the process 300 may further comprise the controller 220 and/or the one or more computing devices 101: subsequently changing, at the security permissions database 121, the document access permissions associated with the identifier to add a further permissible hierarchical document access path to the at least one of the one or more permissible hierarchical document access paths, such that the identifier associated with the user has permission to access respective documents accessible at the further permissible hierarchical document access path; and refraining from re-indexing the documents in the document database as a result of changing the document access permissions Again using the example of the user 114 performing a search using the requesting device 113, document access permissions for the user 114, and/or a group to which the user 114 belongs, may be changed by adding a further document access path to the hierarchical document access paths 151. In particular, hierarchical document access paths 151 may be edited and/or changed to add a further document access path thereto. For example, the hierarchical document access path "A/E" may be added to the hierarchical document access paths 151 that adds access to the folder E for the user 114 and/or the group to which the user 114 belongs. Such a change in access permissions occurs without re-indexing the folder structure 160 and/or the documents 161, 162, for example as no change is made at the document database 122.

In some examples, the process 300 may further comprise the controller 220 and/or the one or more computing devices 101: one or more of: copying the document from a current document access path, of the corresponding hierarchical document access paths, to a further hierarchical document access path; and adding a link to the document to the further hierarchical document access path; and updating the corresponding hierarchical document access paths of the document to include the further hierarchical document access path. For example, to share the document 162 with the user 114 and/or the group to which the user 114 belongs, the document 162, and/or a link thereto, may be copied to the folder B and/or the folder C and/or the folder D. The hierarchical document access path of the copied version of the document 162 and/or the link thereto may be added to the hierarchical document access paths 193 at the document index 180. The hierarchical document access path of the copied version of the document 162 and/or the link thereto may be added to the header 172.

Again using the example of the user 114 performing a search using the requesting device 113, document access permissions for the user 114 may be changed by moving the user identifier 131 to a different group. For example, if the user 114 gets promoted from being a police officer to being a police detective, the user identifier 131 may be moved from being grouped with the group identifier 141 to being grouped with the group identifier 142, which gives the user 114 access to documents in document access paths where the folder A is a highest level access path (e.g. the folders A, B, C, D and E). Such a change in access permissions again occurs without re-indexing the folder structure 160 and/or the documents 161, 162, for example as no change is made at the document database 122.

Figure 4:
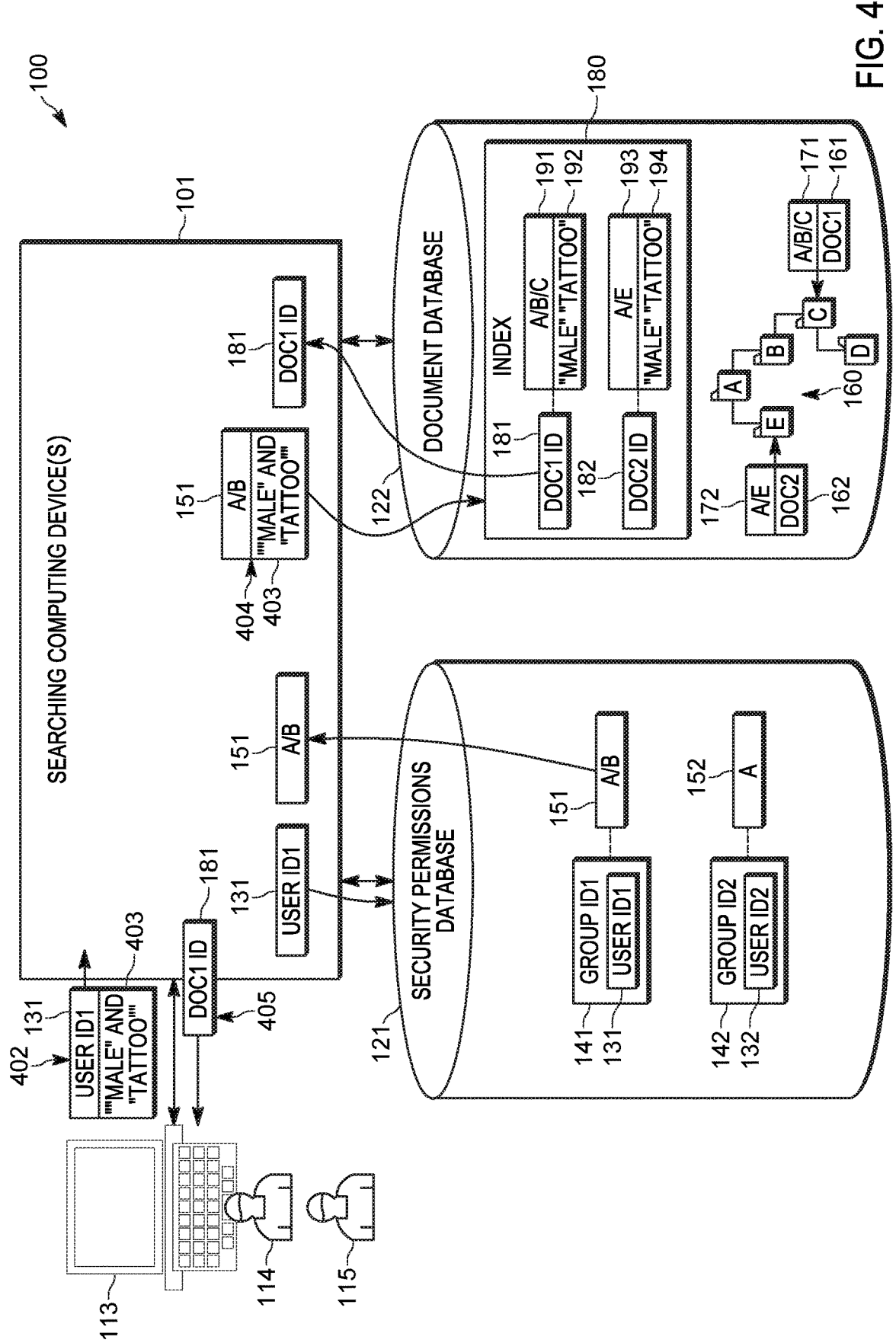
FIG. 4 depicts the system of FIG. 1 implementing a process for controlling document access using hierarchical paths, in accordance with some examples.
Figure 5:
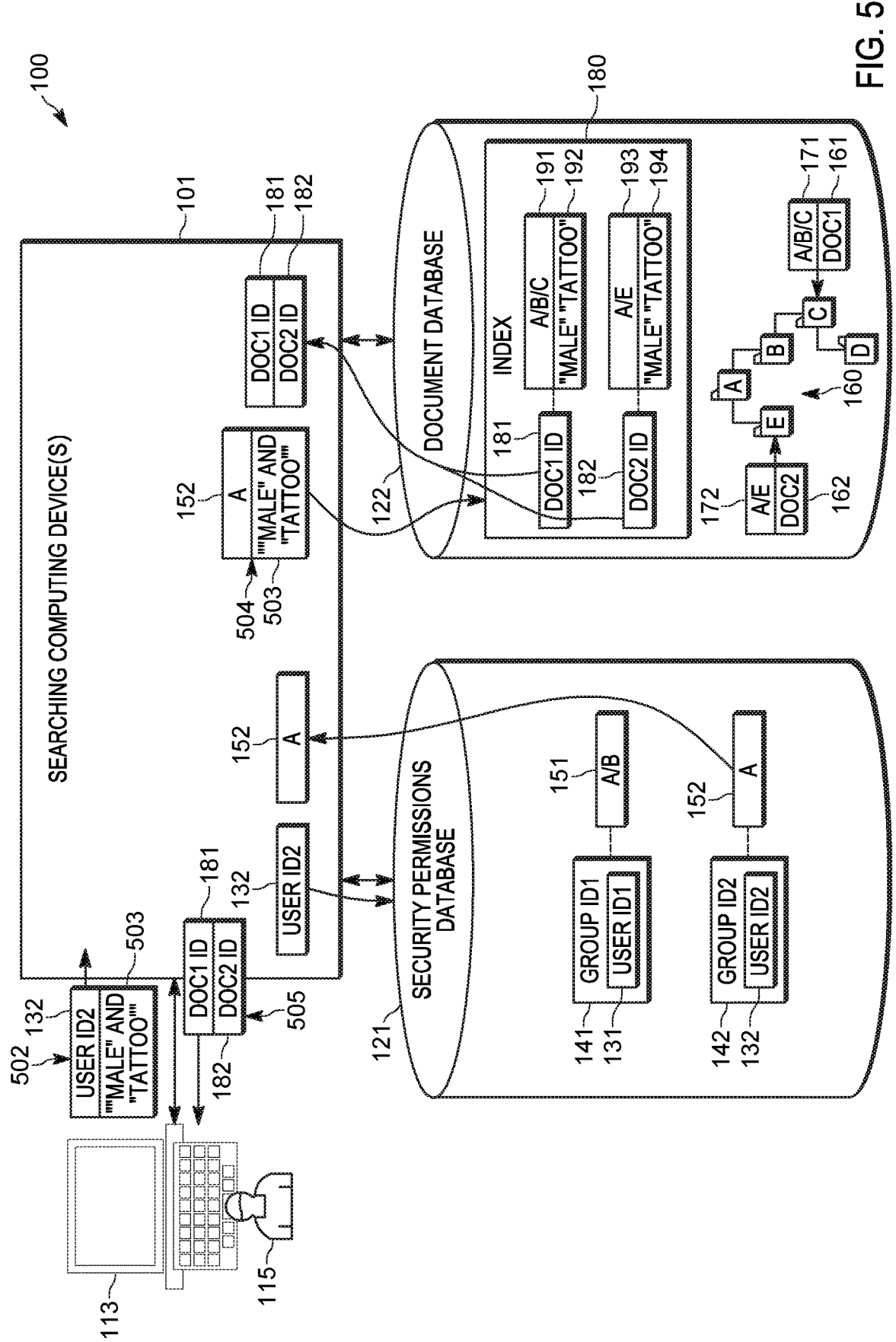
FIG. 5 depicts the system of FIG. 1 implementing a process for controlling document access using hierarchical paths, in accordance with some alternative examples.

Attention is next directed to FIG. 4 and FIG. 5 that depict examples of the process 300. FIG. 4 and FIG. 5 are substantially similar to FIG. 1 with like components having like numbers. While for simplicity the computing devices 101-1, 101-2, the query modification module 111 and the search engine 112 are not depicted, they may nonetheless be present.

Attention is first directed to FIG. 4 that depicts the process 300 being implemented with the user 114 operating the requesting device 113 to transmit a query 402 to the computing device 101. As depicted the query 402 includes the user identifier 131 of the user 114 and a search string 403 that includes keywords "Male" and "Tattoo". The query 402 is received (e.g. at the block 302 of the process 300) at the computing device 101, which accesses (e.g. at the block 304 of the process 300) the security permissions database 121 using the identifier 131 to retrieve and/or receive the associated permissible hierarchical document access path 151.

The computing device 101 modifies (e.g. at the block 306 of the process 300) they query 402 to generate a modified query 404 that includes the associated permissible hierarchical document access path 151 for example in addition to the search string 403. While as depicted the modified query 404 does not include the identifier 131, in other examples, the modified query 404 may include the identifier 131.

The computing device 101 accesses (e.g. at the block 308 of the process 300) the document index 180 at the document database 122 using the modified query 404 to search for documents 161, 162 having respective searchable content portions 192, 194 that include the search string 403 of the modified query 404; and at least one respective corresponding hierarchical document access path 191, 193 encompassed by the permissible hierarchical document access path 151. As depicted, the document 161 meets these criteria and the computing device 101 receives (e.g. at the block 310 of the process 300), the corresponding document identifier 181 from the document index 180 and/or the document database 122.

The computing device 101 provides (e.g. at the block 312 of the process 300) and/or transmits the document identifier 181 to the requesting device 113, for example as search results 405 in response to the query 402. The user 114 may subsequently request the document 161 from the document database 122 via the computing device 101.

Attention is next directed to FIG. 5 that depicts the process 300 being implemented with the user 115 operating the requesting device 113 to transmit a query 502 to the computing device 101. As depicted the query 502 includes the user identifier 132 of the user 115 and a search string 503 that includes keywords "Male" and "Tattoo". In other words the search string 503 is identical to the search string 403.

The query 502 is received (e.g. at the block 302 of the process 300) at the computing device 101, which accesses (e.g. at the block 304 of the process 300) the security permissions database 121 using the identifier 132 to retrieve and/or receive the associated permissible hierarchical document access path 152.

The computing device 101 modifies (e.g. at the block 306 of the process 300) they query 502 to generate a modified query 504 that includes the associated permissible hierarchical document access path 152 for example in addition to the search string 503. While as depicted the modified query 504 does not include the identifier 132, in other examples, the modified query 504 may include the identifier 132.

The computing device 101 accesses (e.g. at the block 308 of the process 300) the document index 180 at the document database 122 using the modified query 504 to search for documents 161, 162 having respective searchable content portions 192, 194 that include the search string 503 of the modified query 504; and at least one respective corresponding hierarchical document access path 191, 193 encompassed by the permissible hierarchical document access path 152. As depicted, the documents 161, 162 meets these criteria and the computing device 101 receives (e.g. at the block 310 of the process 300), the corresponding document identifiers 181, 182 from the document index 180 and/or the document database 122.

The computing device 101 provides (e.g. at the block 312 of the process 300) and/or transmits the document identifiers 181, 182 to the requesting device 113, for example as search results 505 in response to the query 502. The user 115 may subsequently request the document 161 and/or the document 162 from the document database 122 via the computing device 101.

Hence, comparing FIG. 4 and FIG. 5, the user 114 is provided (e.g. at the requesting device 113) with search results 505 that include only the identifier 181 of the document 161 even though the document 162 includes the keywords of the search string 403; whereas the user 115 is provided (e.g. at the requesting device 113) with search results that include the identifier 181, 182 of the documents 161, 162 as both documents 161, 162 includes the keywords of the search string 503. Hence, for the same keywords, the users 114, 115 are provided (e.g. at the requesting device 113) with different search results depending on their respective hierarchical permissible document access paths 151, 152.

It is hence further understood that, when the user identifier 131 is changed from being grouped with the group identifier 141 to being grouped with the group identifier 142, the same query 402 would result in the search results 505. Such a change in access permissions occurs without re-indexing the folder structure 160.

It is further understood that, when the permissible hierarchical document access path 152 is changed from the "A" to "A/B/C" (e.g. similar to the hierarchical document access path 151), the same query 502 would result in the search results 405. Such a change in access permissions occurs without re-indexing the folder structure 160.

Figure 6:
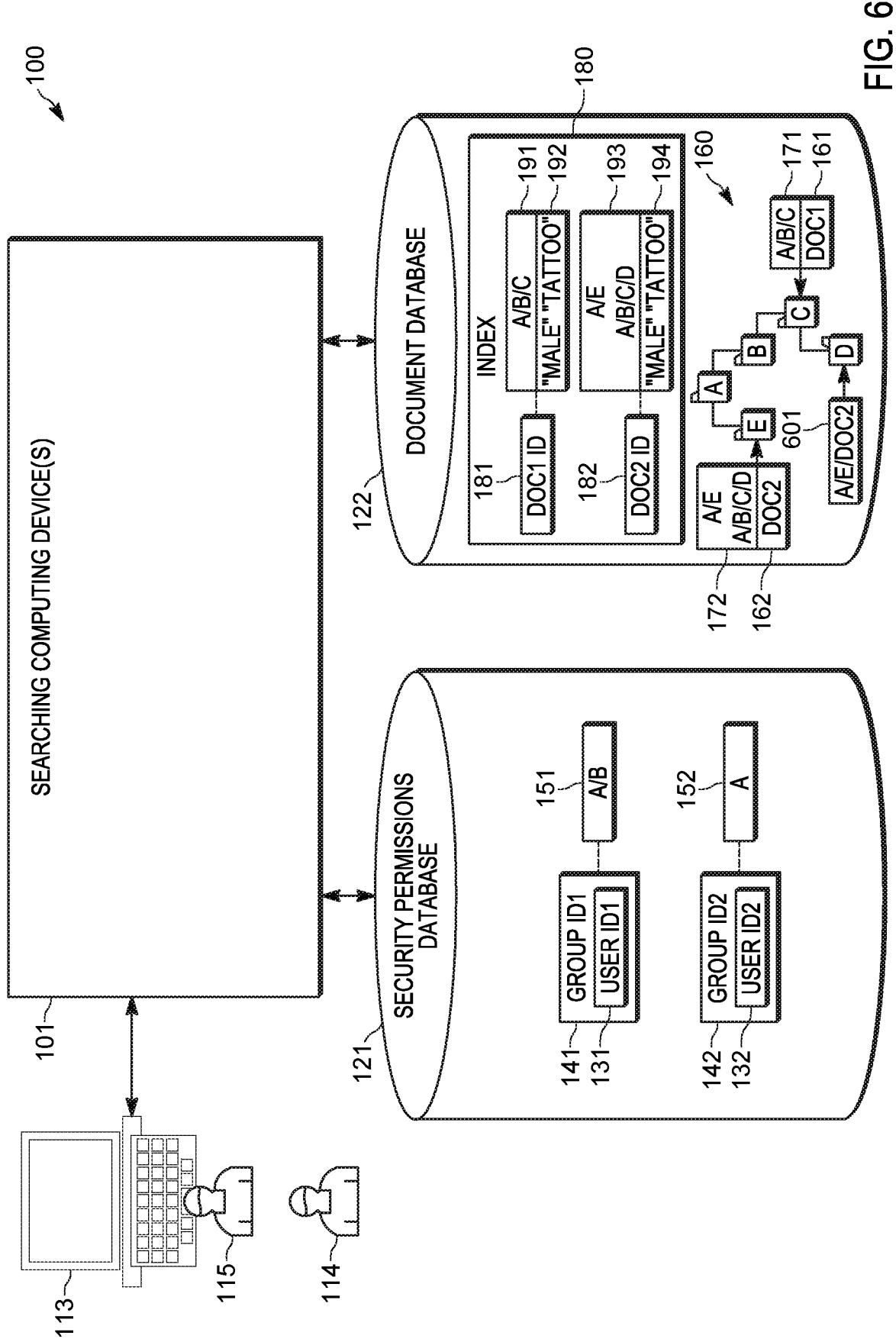
FIG. 6 depicts the system of FIG. 1 updating a document access permission, in accordance with some alternative examples.

Attention is next directed to FIG. 6, which is substantially similar to FIG. 1 with like components having like numbers. While for simplicity the computing devices 101-1, 101-2, the query modification module 111 and the search engine 112 are not depicted, they may nonetheless be present.

FIG. 6 depicts an example of the user 115 sharing the document 162 with the user 114 and/or a group to which the user 114 belongs. As depicted, the user 115 is operating the requesting device 113 to interact with the document database 122 to add a link 601 to the document 162 to folder D. Hence, in these examples, it is understood that the requesting device 113 is configured to interact with the computing device 101 to search and/or update the document database 122. However, the user 115 (and/or another user) may update the document database 122 using any suitable device.

As depicted, the link 601 to the document 162 comprises a document access path and a name of the document 162, for "A/E/Doc2", though the link 601 may be in any suitable format.

As depicted, when the link 601 to the document 162 is stored at the folder D, the header 172 of the document 162 may be changed to include the access path "A/B/C/D".

When such a change occurs, the document 162 may be re-indexed to at least update the hierarchical document access path 193 of the document 162 stored in the document index 180. For example, as depicted, the hierarchical document access paths 193 of the document 162 includes both the document access path "A/E" and the document access path "A/B/C/D". Hence, when the user 114 again operates the requesting device 113 to search the document database 122 using the same keywords of the query 402, the search results will include the document identifier 182 of the document 162 as the link 601 is stored in a document access path encompassed by the permissible hierarchical document access path 151.

Alternatively the document 162 may be shared with the user 114 by storing the link 601 in the folder B and/or the folder C, and/or by storing a copy of the document 162 in the in the folder B and/or the folder C and/or the folder D.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, device, or apparatus that comprises, has, includes, contains a list of elements does not include only those elements but may include other elements not expressly listed or inherent to such process, method, article, device, or apparatus. An element proceeded by "comprises . . . a", "has . . . a", "includes . . . a", "contains . . . a" does not, without more constraints, preclude the existence of additional identical elements in the process, method, article, device, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the process, method, device, and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method or process as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   indexing, at one or more computing devices, a document database;
   receiving, at one or more computing devices, from a requesting device, a query comprising: a search string for searching the document database; and an identifier associated with a user;
   accessing, at the one or more computing devices, using the identifier, a security permissions database to receive one or more permissible hierarchical document access paths, of a folder structure, indicating document access permissions associated with the identifier;

modifying, at the one or more computing devices, the query to include the one or more permissible hierarchical document access paths to generate a modified query;

accessing, by the one or more computing devices, using the modified query, a document index of the document database, the document index comprising, for documents indexed by the document index: a searchable content portion of a document; and corresponding hierarchical document access paths, of the folder structure, of the document;

receiving, by the one or more computing devices, search result document identifiers identifying only the documents from the document database having: respective searchable content portions that include the search string of the modified query; and at least one respective corresponding hierarchical document access path, of the folder structure, encompassed by the one or more permissible hierarchical document access paths;

providing, by the one or more computing devices, to the requesting device, the search result document identifiers; and subsequently changing, at the security permissions database, the document access permissions associated with the identifier to change at least one of the one or more permissible hierarchical document access paths, such that the identifier associated with the user has changed permissions to access respective documents accessible at the one or more permissible hierarchical document access paths that are changed, and, in response, refraining from re-indexing the documents in the document database as a result of changing the document access permissions.

2. The method of claim 1, wherein the identifier comprises one or more of: a user identifier identifying the user; and a group identifier identifying a group of which the user is a member, and wherein the document access permissions associated with the identifier, as indicated by the one or more permissible hierarchical document access paths, set forth the document access permissions of one or more of the user and the group.

3. The method of claim 1, further comprising:
receiving a request to retrieve a particular document having a particular search result document identifier out of the search result document identifiers provided to the requesting device; and retrieving the particular document from the document database, the particular document comprising a header that includes one or more respective corresponding hierarchical document access paths where the particular document is accessible.

4. The method of claim 3, wherein the header of the particular document includes a plurality of respective corresponding hierarchical document access paths where the particular document is accessible.

5. The method of claim 1 wherein the subsequently changing, at the security permissions database, the document access permissions associated with the identifier to change at least one of the one or more permissible hierarchical document access paths comprises:
subsequently changing, at the security permissions database, the document access permissions associated with the identifier to one or more of modify and remove at least one of the one or more permissible hierarchical document access paths, such that the identifier associated with the user no longer has permission to access respective documents accessible at the one or more permissible hierarchical document access paths that was one or more of modified and removed.

6. The method of claim 1, wherein the subsequently changing, at the security permissions database, the document access permissions associated with the identifier to change at least one of the one or more permissible hierarchical document access paths comprises:
subsequently changing, at the security permissions database, the document access permissions associated with the identifier to add a further permissible hierarchical document access path to the at least one of the one or more permissible hierarchical document access paths, such that the identifier associated with the user has permission to access respective documents accessible at the further permissible hierarchical document access path.

7. The method of claim 1, wherein:
a query modification module operating at a first computing device, of the one or more computing devices, generates the modified query;
a search engine operating at a second computing device, of the one or more computing devices, accesses the document index using the modified query; and
the first computing device and the second computing device are configured to communicate with each other.

8. The method of claim 1, wherein a permissible hierarchical document access path, of the permissible hierarchical document access paths, indicates a respective highest level hierarchical path to which the user associated with the identifier has been permitted access.

9. The method of claim 1, wherein the at least one respective corresponding hierarchical document access path is encompassed by the one or more permissible hierarchical document access paths when the at least one respective corresponding hierarchical document access path comprises a lower level hierarchical document access path of the one or more of the permissible hierarchical document access paths.

10. The method of claim 1, further comprising:
one or more of: copying the document from a current document access path, of the corresponding hierarchical document access paths, to a further hierarchical document access path; and adding a link to the document to the further hierarchical document access path; and
updating the corresponding hierarchical document access paths of the document to include the further hierarchical document access path.

11. A computing device comprising:
a communication unit; and
a controller configured to:
index a document database:
receive, via the communication unit, from a requesting device, a query comprising: a search string for searching the document database; and an identifier associated with a user;
access, using the identifier, a security permissions database to receive one or more permissible hierarchical document access paths, of a folder structure, indicating document access permissions associated with the identifier;
modify the query to include the one or more permissible hierarchical document access paths to generate a modified query;
access, using the modified query, a document index of the document database, the document index comprising, for documents indexed by the document index: a searchable content portion of a document; and corresponding hierarchical document access paths, of the folder structure, of the document;

receive, search result document identifiers identifying only the documents from the document database having: respective searchable content portions that include the search string of the modified query; and at least one respective corresponding hierarchical document access path, of the folder structure, encompassed by the one or more permissible hierarchical document access paths;

provide, via the communication unit, to the requesting device, the search result document identifiers; and subsequently change, at the security permissions database, the document access permissions associated with the identifier to change at lest one of the one or more permissible hierarchical document access paths, such that the identifier associated with the user has chaff wed permissions to access respective documents accessible at the one or more permissible hierarchical document access paths that are changed, and, in response, refrain from re-indexing the documents in the document database as a result of changing the document access permissions.

12. The computing device of claim 11, wherein the identifier comprises one or more of: a user identifier identifying the user; and a group identifier identifying a group of which the user is a member, and wherein the document access permissions associated with the identifier, as indicated by the one or more permissible hierarchical document access paths, set forth the document access permissions of one or more of the user and the group.

13. The computing device of claim 11, wherein the controller is further configured to:

receive a request to retrieve a particular document having a particular search result document identifier out of the search result document identifiers provided to the requesting device; and retrieve the particular document from the document database, the particular document comprising a header that includes one or more respective corresponding hierarchical document access paths where the particular document is accessible.

14. The computing device of claim 13, wherein the header of the particular document includes a plurality of respective corresponding hierarchical document access paths where the particular document is accessible.

15. The computing device of claim 11, wherein the controller is further configured to subsequently change, at the security permissions database, the document access permissions associated with the identifier to chance at least one of the one or more permissible hierarchical document access paths by:

subsequently change, at the security permissions database, the document access permissions associated with the identifier to one or more of modify and remove at least one of the one or more permissible hierarchical document access paths, such that the identifier associated with the user no longer has permission to access respective documents accessible at the one or more permissible hierarchical document access paths that was one or more of modified and removed.

16. The computing device of claim 11, wherein the controller is further configured to subsequently change, at the security permissions database, the document access permissions associated with the identifier to change at least one of the one of more permissible hierarchical document access paths by:

subsequently change, at the security permissions database, the document access permissions associated with the identifier to add a further permissible hierarchical document access path to the at least one of the one or more permissible hierarchical document access paths, such that the identifier associated with the user has permission to access respective documents accessible at the further permissible hierarchical document access path.

17. The computing device of claim 11, further comprising:

a query modification module configured to generate the modified query; and a search engine configured to access the document index using the modified query.

18. The computing device of claim 11, wherein a permissible hierarchical document access path, of the permissible hierarchical document access paths, indicates a respective highest level hierarchical path to which the user associated with the identifier has been permitted access.

19. The computing device of claim 11, wherein the at least one respective corresponding hierarchical document access path is encompassed by the one or more permissible hierarchical document access paths when the at least one respective corresponding hierarchical document access path comprises a lower level hierarchical document access path of the one or more of the permissible hierarchical document access paths.

20. The computing device of claim 11, wherein the controller is further configured to:

one or more of: copy the document from a current document access path, of the corresponding hierarchical document access paths, to a further hierarchical document access path; and add a link to the document to the further hierarchical document access path; and update the corresponding hierarchical document access paths of the document to include the further hierarchical document access path.

\* \* \* \* \*